United States Patent Office 2,948,709
Patented Aug. 9, 1960

2,948,709
CATALYZED HALOGENATION OF RUBBERY COPOLYMERS

Irving Kuntz, Roselle Park, N.J., assignor to Esso Research and Engineering Company, a corporation of Delaware No Drawing. Filed Dec. 27, 1956, Ser. No. 630,770

10 Claims. (Cl. 260—85.3)

This invention relates to rubbery polymeric compositions which are halogenated low unsaturation hydrocarbon materials and particularly copolymers of isoolefins and multiolefins and to the preparation of such compositions. More particularly the present invention relates to improved methods for halogenating butyl rubber at low temperatures and at a rapid rate with minor proportions of certain N-halogeno compounds in the presence of minor proportions of peroxide catalysts.

Butyl rubber is a copolymer of a major proportion of a $C_4$ to $C_8$ isoolefin and a minor proportion of a $C_4$ to $C_{14}$ multiolefin. These copolymers are commonly referred to in the literature as butyl rubber or GR–I rubber (Government Rubber-Isobutylene) and for example, is referred to as "butyl rubber" in the book "Synthetic Rubber" by G. S. Whitby. The expression "butyl rubber" as employed in the specification and claims is intended to include copolymers containing about 85 to 99.5 weight percent of an isoolefin and about 15 to 0.5 weight percent of a multiolefin which is preferably a conjugated diolefin. The preparation of butyl rubber, which is preferably the reaction product of isobutylene and isoprene, is amply described in U.S. Patent No. 2,356,128 to Thomas et al.

Butyl rubber may be improved as to covulcanizability with other rubbery polymers and particularly with high unsaturation rubbers such as diene rubbers or natural rubber by partially halogenating the butyl rubber at elevated temperatures of say at least about 80° to 120° C. with solid halogenated agents of the class of N-bromo or N-chloro organic compounds. In order for such halogenations to be performed at relatively fast rates the foregoing temperatures are the minimum useable. However, such a process results in molecular weight breakdown of the butyl rubber copolymer during halogenation. It has been attempted to halogenate butyl rubber with N-halogeno compounds at temperatures of less than about 80° C. but such low temperatures result in an inferior product. For instance, such rubbers have not been found to be covulcanizable with high unsaturation rubbery polymers such as natural rubber, diene-styrene, copolymers, diene nitrile rubbers, chloroprene rubber of the like and cannot be cured satisfactorily solely with basic metal compounds such as zinc stearate or especially zinc oxide.

In accordance with the present invention, it has now been discovered that when butyl rubber is reacted with N-halogeno compounds in the presence of about 0.01 to 25 weight percent, preferably between about 0.05 to 20 weight percent and even more especially about 0.1 to 15 weight percent based on rubber of a peroxide catalyst, high quality partially halogenated derivatives of butyl rubber are produce at temperatures below about 75° C. The halogenated butyl rubbers produced in accordance with the present invention have been found to be vulcanizable at temperatures between about 200° and 450° F. with zinc and oxygen containing compounds alone or in admixture with carbon blacks with or without such anti-tack agents as stearic acid. The halogenated rubbery copolymers produced in accordance with the present invention have also been found to be readily covulcanizable with other rubbery polymers such as those hereinbefore mentioned to produce vulcanizates having satisfactory tensile strengths of well above 1,000 p.s.i. and in many cases above 2,000 p.s.i.

In a preferred embodiment of the present invention, butyl rubber is dissolved in an inert solvent and halogenated by N-halogeno compounds in the presence of the above mentioned amounts of a peroxide catalyst at temperatures below about 75° C., advantageously between about 10° to 70° C. and preferably between about 20° to 60° C. for times between about 1 minute to 5 hours and preferably between about 5 minutes and 2 hours. The rubber solvents employed are those which do not react with peroxide type catalysts or N-halogeno compounds and are preferably substantially saturated normal aliphatic or aromatic hydrocarbons and/or halogenated derivatives thereof, examples of which are hexane, heptane, benzene, chlorobenzene, chloroform dichloroethane, carbon tetrachloride, mixtures thereof, etc.

For the purposes of the present invention, the peroxide catalyst may comprise such peroxidic material as hydrogen peroxide, dicumyl peroxide, benzoyl peroxide, tetralin hydroperoxide, ditertiary butyl peroxide, ascaridole, tertiary butyl hydroperoxide, cumene hydroperoxide, peracetic acid, acetyl peroxide, etc.

The N-halogeno compounds, useful for the purposes of the present invention, are preferably N-bromo- and/or N-chloro-compounds examples of which are N,N'-dichloro - 5,5 - dimethylhydantoin, N-bromo succinimide, N-halogeno phthalimides such as N-bromo phthalimide or N-chlorophthalimide, N,N'-dibromo - 5,5 - dimethyl hydantoin, etc.

The foregoing compounds may be generalized by the formulae:

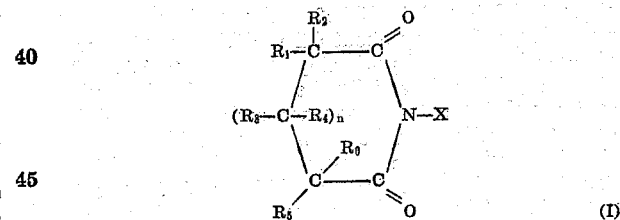

(I)

and

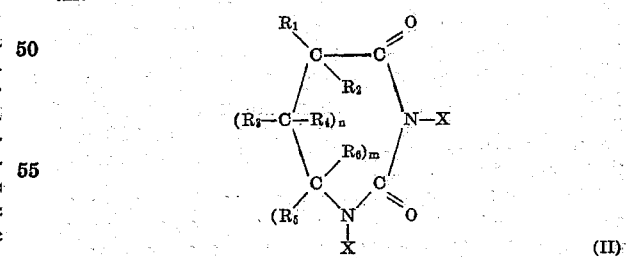

(II)

wherein $n$ and $m$ are 0 to 20, $R_1$ to $R_6$ being selected from the group consisting of hydrogen, and $C_1$ to $C_{18}$ alkyl, aryl, aralkyl and alkaryl groups, and X is halogen, preferably chlorine and/or bromine.

In preparing chlorinated butyl rubber or brominated butyl rubber in accordance with the present invention, the rubbery copolymer is dissolved so as to form about a 2 to 40 weight percent solution in one of the foregoing rubber solvents. The resulting solution is then contacted with an admixture of an N-chloro and/or N-bromo compound such as those outlined above, and also with a peroxide catalyst of the type and in the amounts hereinbefore described, at temperatures between about 10° and 70° C. The chlorination is conducted in a manner which does not substantially degrade the molecular weight of the copolymer by regulating the amount of brominating or chlorinating agent and catalyst as outlined above and as hereinafter more fully described. More particularly, molecular weight degradation is avoided by using the foregoing low temperature bromination or chlorination conditions but catalyzing the reaction in accordance with the present invention with minor proportions of a peroxide catalyst. Also, the halogenation is carried out so as to make the resulting halogenated butyl rubber contain at least about 0.5 weight percent, preferably at least about 1.0 weight percent halogen but not more than a halogen content of about 3.0 "X" weight percent and preferably not more than a halogen content of about 2.0 "X" weight percent wherein:

$$X = \frac{M_3 L}{(100-L) M_1 + L(M_2 + M_3)} \times 100$$

and:

L = mole percent of the multiolefin in the polymer
$M_1$ = molecular weight of the isoolefin
$M_2$ = molecular weight of the multiolefin
$M_3$ = atomic weight of chlorine or bromine.

Restated, the polymer should have a halogen content of at least about 0.5 weight percent, but not more than about 3 atoms of halogen per molecule of multiolefin present in the polymer and preferably not more than about 2 halogen atoms per molecule of multiolefin, i.e. not more than about two atoms of halogen per double bond in the copolymer. Based on the above, the amount of N-halogeno- compound employed is generally between about 1.0 and 80 weight percent and preferably between about 5.0 and 50 weight percent based on butyl rubber. The amount will depend upon the unsaturation of the butyl rubber copolymer as well as the molecular weight of the N-halogeno compound.

The halogenated copolymer formed advantageously has a viscosity average molecular weight of between about 250,000 and 2,000,000 and a mole percent unsaturation of between about 0.2 to 15.0, advantageously about 0.4 to 10 and preferably about 0.6 to 3.0. This copolymer has substantially the same molecular weight as the unhalogenated copolymer and when cured has good to excellent tensile strength, extension modulus, abrasion resistance, elongation, and flexure resistance and outstanding gas impermeability and heat aging properties. The halogenated rubbery copolymer also has the property of being vulcanizable with zinc oxide and/or sulfur with or without other added vulcanization accelerators and is also covulcanizable with other rubbery polymers. The vulcanization of such a copolymer halogenated in accordance with the present invention, is generally performed at temperatures between about 200° and 450° F. preferably between about 250 and 400° F. for times between about a minute up to several hours (e.g. 5.0) or more.

The resulting halogenated butyl rubber, produced in accordance with the present invention, whether chlorinated butyl rubber and/or brominated butyl rubber, may be recovered in generally the same manner as for unmodified butyl rubber. For example, the chlorinated butyl rubber and/or brominated butyl rubber polymer may be recovered from solution by precipitation with acetone or any other known non-solvent for the rubber with a subsequent drying step under about 1 to 760 mm. or higher of mercury pressure absolute at temperatures between about 0° and 180° C., preferably between about 50° and 150° C. (e.g. 70° C.). Other methods of recovering the halogenated butyl rubber copolymer from the solution of the same are by conventional spray or drum drying techniques. Alternatively the halogenated butyl rubber containing-solution may be injected into a vessel containing a higher boiling polymer non-solvent, preferably agitated water, heated to a temperature sufficient to flash off the solvent and form an aqueous slurry of the halogenated butyl rubber. The rubber may then be recovered from this slurry by filtration, dried and recovered as a "crumb" or as a dense sheet or slab by conventional milling and/or extruding procedures.

In order to more fully illustrate the present invention, the following experimental data are given:

*Example I*

A solution of a commercial butyl rubber corresponding to GR–I–18 rubber is prepared having a concentration of 70 grams of rubber copolymer dissolved in 700 cc. of benzene. The rubber has a Mooney viscosity at 212° F. for 8 minutes of 75, a mole percent unsaturation of 1.6, and a viscosity average molecular weight of 310,000. To the foregoing solution is then added 18 grams of N,N'-dichloro-5,5-dimethyl-hydantoin and to this solution there is added 10 grams of ditertiary butyl peroxide. The reaction solution is then heated at 40–60° C. (e.g. 50° C.) for 1.5 hours. The chlorinated butyl rubber formed is then isolated by conventional solution-precipitation technique using hexane as the solvent and acetone as the antisolvent. Upon analysis, the rubber is found to contain 1.95 weight percent chlorine and 0.011% nitrogen. The solution of the chlorinated copolymer also has an intrinsic viscosity in diisobutylene of 1.10 and a viscosity average molecular weight of 305,000.

100 parts by weight of the foregoing rubbery chlorinated butyl copolymer are then compounded on a rubber mill into the following formulation:

| Components: | Parts by weight |
|---|---|
| SRF carbon black (Pelletex) | 50 |
| Zinc oxide | 5 |
| Stearic acid | 0.5 |

Upon curing the foregoing compounded chlorinated butyl rubber, produced in accordance with the present invention, at a temperature level of 300° F. for a time of 60 minutes, the following physical inspections are noted:

| Property: | Value |
|---|---|
| Tensile strength (p.s.i.) | 1270 |
| Elongation (percent) | 390 |
| Extension modulus at 300% elongation (p.s.i.) | 950 |

The foregoing procedure is repeated but omitting the peroxide catalyst. Upon compounding and curing under the identical conditions as outlined above, the resulting rubbery modified product did not vulcanize.

The above data show that chlorinated butyl rubber, produced in the presence of a peroxide catalyst at low temperatures using N-chloro compounds as the chlorinating agent, may be vulcanized solely by metal oxides such as zinc oxide, but that the omission of the peroxide catalyst results in a product which cannot be vulcanized by metal oxides alone.

*Example II*

The same general procedure as in Example I is repeated using 0.1 gram of benzoyl peroxide as the peroxide catalyst and 30 grams of N-bromo succinimide as the halogenating agent for a reaction period of one hour. The modified butyl rubber formed contains 2.94 weight percent bromine and has an intrinsic viscosity in diisobutylene of 1.11 corresponding to a viscosity average molecular weight of 310,000. Upon compounding and curing in accordance with Example I, the brominated vulcanizate formed is found to have a tensile strength above 1,000 p.s.i., an elongation above 300% and a modulus at 300% elongation between 900 and 1200 p.s.i.

Example II shows, as does Example I, that butyl rubber may be halogenated with N-halogeno compounds at temperatures between about 20° and 70° C. in the presence of peroxide catalysts to yield good vulcanizates whereas in all instances where the halogenation is performed in the absence of peroxide catalysts, products which do not vulcanize with metal oxides are obtained.

Resort may be had to various modifications and variations of the disclosed embodiments of the present invention without departing from the spirit of the invention or the scope of the appended claims.

What is claimed is:

1. In a process for halogenating rubbery isoolefin-multiolefin copolymers, the improvement which comprises dissolving the copolymer in an inert solvent, reacting said copolymer with a cyclic N-halogeno compound as the halogenating agent at a temperature level of between about 10° and 75° C. in the presence of about 0.01 to 25 weight percent based on copolymer of a peroxide catalyst, said cyclic N-halogeno compound having a structure selected from the group consisting of:

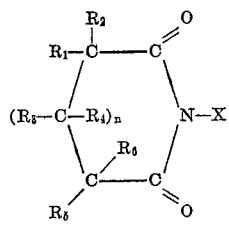

and

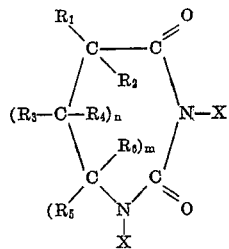

$n$ and $m$ being about 0 to 20, $R_1$ to $R_6$ being selected from the group consisting of hydrogen, and $C_1$ to $C_{18}$ alkyl groups, and X being selected from the group consisting of chlorine and bromine, the halogenation reaction being conducted until the copolymer contains at least about 0.5 weight percent combined halogen but not more than 3.0 X weight percent combined halogen in which:

$$X = \frac{M_3 L}{(100-L)M_1 + L(M_2 + M_3)} \times 100$$

and:

L = mole percent of the multiolefin in the polymer
$M_1$ = molecular weight of the isoolefin
$M_2$ = molecular weight of the multiolefin
$M_3$ = atomic weight of chlorine or bromine.

2. A process according to claim 1 in which the halogenating agent contains chlorine.

3. A process according to claim 1 in which the halogenating agent contains bromine.

4. A process according to claim 1 in which the copolymer is butyl rubber, the peroxide catalyst being selected from the group consisting of ditertiary butyl peroxide, benzoyl peroxide, dicumyl peroxide, cumene hydroperoxide, and mixtures thereof.

5. A process according to claim 4 in which the butyl rubber is reacted with the N-halogeno compound while the butyl rubber is dissolved in a substantially inert solvent.

6. A process for halogenating an isoolefin-multiolefin butyl rubber copolymer which comprises dissolving the butyl rubber copolymer in a substantially inert solvent, regulating the temperature to a level between about 10° and 70° C. and reacting the butyl rubber copolymer while dissolved in the solvent with a cyclic N-halogeno compound, said cyclic N-halogeno compound having a structure selected from the group consisting of:

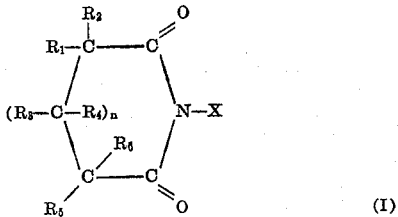

and

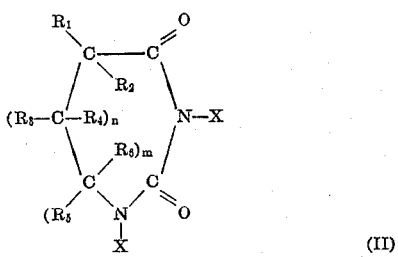

wherein $n$ and $m$ are 0 to 20, $R_1$ to $R_6$ being selected from the group consisting of hydrogen, and $C_1$ to $C_{18}$ alkyl, aryl, aralkyl and alkaryl groups, and X is selected from the group consisting of chlorine and bromine, in the presence of about 0.05 to 20 weight percent based on copolymer of a peroxide catalyst until the copolymer contains at least about 0.5 weight percent combined halogen but not more than about 2.0 X weight percent combined halogen in which:

$$X = \frac{M_3 L}{(100-L)M_1 + L(M_2 + M_3)} \times 100$$

and:

L = mole percent of the multiolefin in the polymer
$M_1$ = molecular weight of the isoolefin
$M_2$ = molecular weight of the multiolefin
$M_3$ = atomic weight of chlorine or bromine.

7. A process according to claim 6 in which the halogenated rubber copolymer formed does not contain more than about two gram atoms of halogen per mole of double bonds in the rubber.

8. A process according to claim 6 in which the solvent is selected from the group consisting of substantially saturated normal aliphatic hydrocarbons, aromatic hydrocarbons, and halogenated derivatives thereof.

9. A process according to claim 6 in which the N-halogeno compound is an N,N'-dihalo-5,5-dimethyl hydantoin.

10. A process according to claim 6 in which the N-halogeno compound is an N-halo succinimide.

References Cited in the file of this patent

UNITED STATES PATENTS

| | | |
|---|---|---|
| 2,291,574 | Gleason et al. | July 28, 1942 |
| 2,327,517 | Frolich et al. | Aug. 24, 1943 |
| 2,631,984 | Crawford et al. | Mar. 17, 1953 |
| 2,681,899 | Crawford et al. | June 22, 1954 |
| 2,732,354 | Morrissey et al. | Jan. 24, 1956 |
| 2,779,764 | Paterson | Jan. 29, 1957 |
| 2,804,448 | Hallenbeck | Aug. 27, 1957 |
| 2,816,098 | Morrissey | Dec. 10, 1957 |

OTHER REFERENCES

Salellas et al.: Chem. Abs., 45, page 2873 (1951).